T. A. CLEAVER.
PHONOGRAPHIC REPRODUCING INSTRUMENT FOR ORGANS.
APPLICATION FILED MAR. 17, 1916.
1,317,127.
Patented Sept. 23, 1919.
2 SHEETS—SHEET 1.
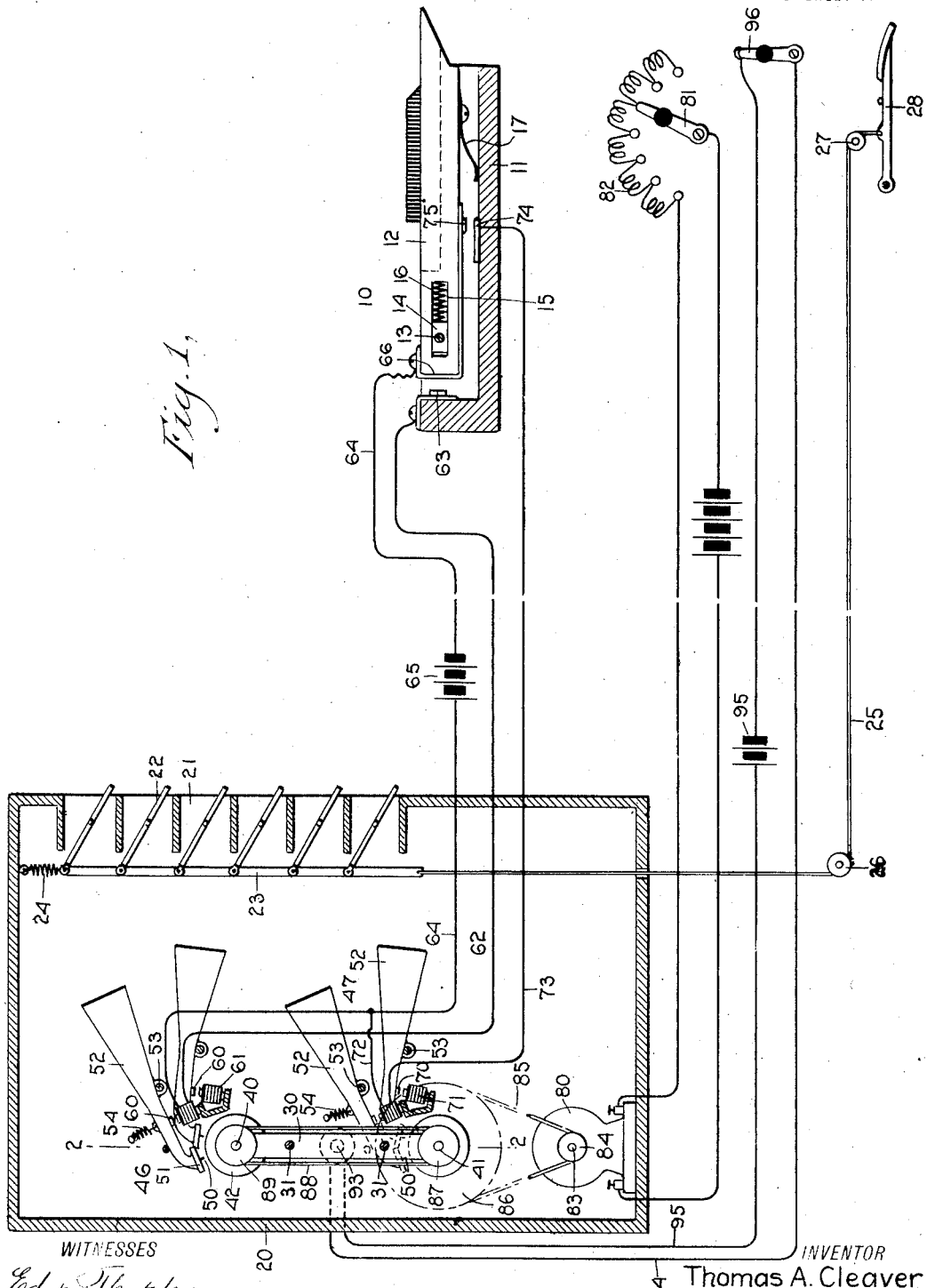
WITNESSES
Edw. Thorpe
Rev. J. Wooster
INVENTOR
Thomas A. Cleaver
BY
ATTORNEYS T. A. CLEAVER.
PHONOGRAPHIC REPRODUCING INSTRUMENT FOR ORGANS.
APPLICATION FILED MAR. 17, 1916.
1,317,127.
Patented Sept. 23, 1919.
2 SHEETS—SHEET 2.
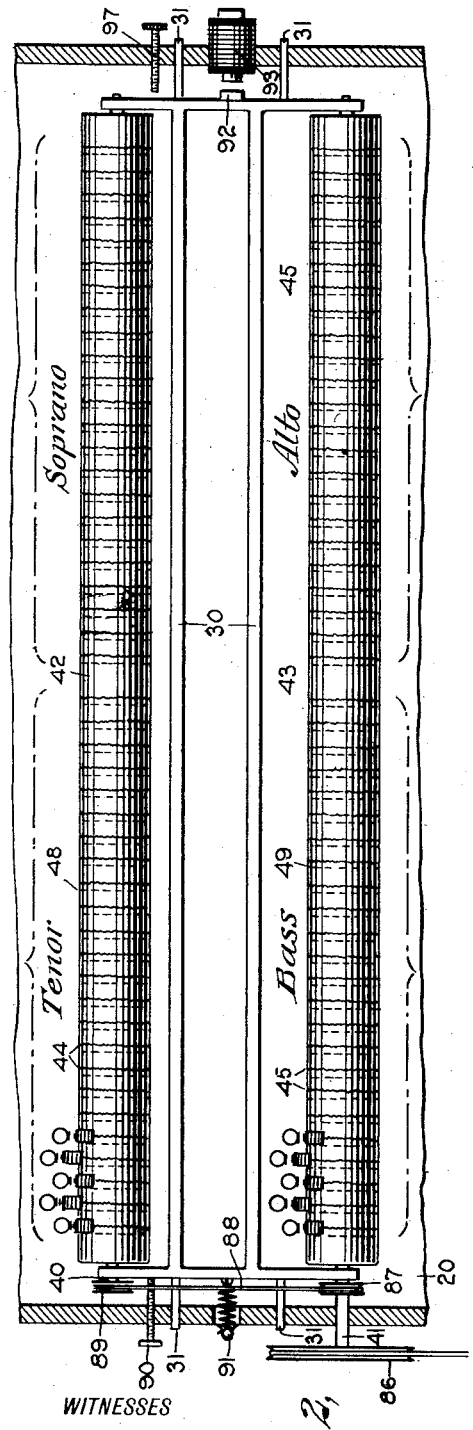
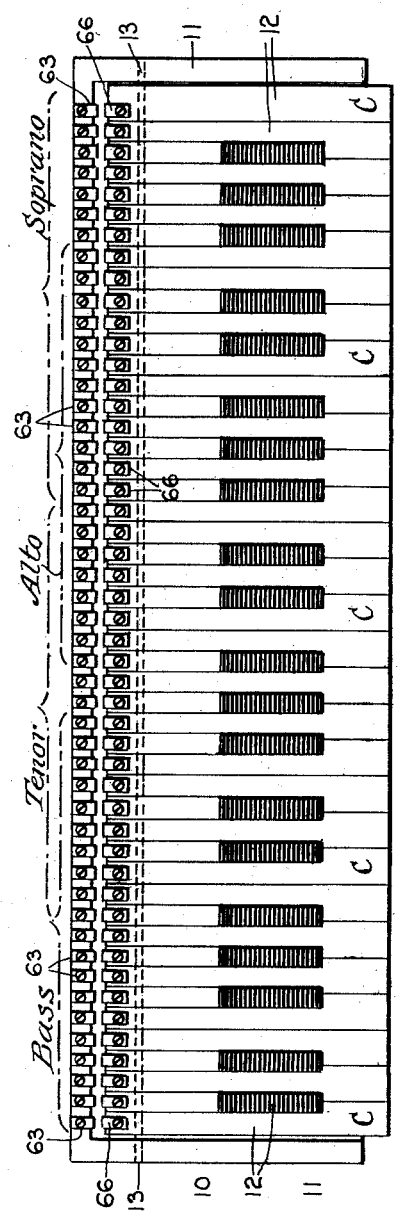
WITNESSES
Edw. Thorpe
INVENTOR
Thomas A. Cleaver
BY
ATTORNEYS

UNITED STATES PATENT OFFICE.

THOMAS ALLEN CLEAVER, OF BROOKLYN, NEW YORK.

PHONOGRAPHIC REPRODUCING INSTRUMENT FOR ORGANS.

1,317,127. Specification of Letters Patent. Patented Sept. 23, 1919.

Application filed March 17, 1916. Serial No. 84,800.

*To all whom it may concern:*

Be it known that I, THOMAS ALLEN CLEAVER, a citizen of the United States, and a resident of the city of New York, borough of Brooklyn, in the county of Kings and State of New York, have invented a new and Improved Phonographic Reproducing Instrument for Organs, of which the following is a full, clear, and exact description.

The invention relates to the vox humana of organs and its object is to provide certain new and useful improvements in phonographic reproducing instruments for organs arranged to enable the organist to throw in the vox humana singly in tenor, bass, soprano or alto voice, or as a desired combination of the same for the production of a duet of a quartette.

In order to accomplish the desired result, use is made of a keyboard having keys encompassing the range of the human voice, a distant swell box provided with movable shutters, single tone phonographic records of tenor, bass, soprano and alto voices arranged in the said swell box, normally inactive phonographic reproducing devices located in the said swell box and adapted to coact with the said phonographic records, and means controlled by the keys of the said keyboard and controlling the said reproducing devices to actuate the latter on actuating the corresponding keys of the keyboard. The keys of the said keyboard are mounted to swing and to slide, the keys encompassing the range of the human voice for tenor, bass, soprano and alto, sundry of the keys in one position being tenor keys, and in another position being bass or alto keys, and sundry of the keys in one position being soprano keys and in another position being alto keys.

A practical embodiment of the invention is represented in the accompanying drawings forming a part of this specification, in which similar characters of reference indicate corresponding parts in all the views.

Figure 1 is a diagrammatic view of the phonographic reproducing instrument for organs;

Fig. 2 is a cross section of the swell box, the single tone phonographic records and the sound reproducing devices therein being shown in elevation, the section being on the line 2—2 of Fig. 1; and Fig. 3 is a plan view of the keyboard.

The keyboard 10 is provided with a key frame 11 on which are mounted to swing and to slide a series of white and black keys 12 encompassing the range of the human voice for tenor, bass, soprano and alto. In order to allow the keys to swing and to slide at the option of the organist, the following arrangement is made: On the key frame 11 is arranged a longitudinally extending pivot 13 passing through blocks 14 each mounted to slide in a transverse direction in a guideway 15 formed in each of the keys 12. A spring 16 is interposed between the front end of each block 14 and the front end of the corresponding guideway 15 so as to normally hold the corresponding key 12 in a forward position. The front end of each key 12 is provided at the under side with a spring 17 resting with its free end on the key frame 11 to normally hold each key 12 in an approximately horizontal position. By the arrangement described the organist can press a key against the tension of the spring 17 or he can slide the key transversely against the tension of the spring 16, the key when released being returned to its normal position by the corresponding spring 17 or 16.

A swell box 20 is located a distance from the keyboard 10 at any desired place usually the place now occupied by the ordinary vox humana of the organ. The swell box 20 is provided at its open front 21 with shutters 22 pivotally connected with a rod 23 pressed on at one end by a spring 24. A cord or other flexible connection 25 is attached to the other end of the rod 23 and passes over guide pulleys 27 to a pedal 28 under the control of the organist to enable the latter to manipulate the shutter 22 with a view to more or less open and close the open front 21 of the swell box 20. It is understood that I do not limit myself to this particular controlling device for the shutter as the same may be varied without deviating from my invention.

Within the swell box 20 is arranged a frame 30 having pins 31 slidably engaging the ends of the swell box 20 to allow of shifting the frame 30 within the swell box. In the frame 30 are journaled the shafts 40 and 41 of cylindrical phonographic records 42 and 43 provided on their peripheral faces with sound grooves or undulations 44 and 45, each of which represents a single note of the human voice. The two rollers 42 and 43 are provided with single tone sound grooves representing the tones and semi-tones of tenor, bass, soprano and alto voices, the tenor and soprano sound grooves 44 being preferably on the record 42 and the bass and alto sound grooves 45 being on the record 43, as indicated in Fig. 2. Within the swell box 20 are arranged two sets of sound reproducing devices 46 and 47 normally inactive and adapted to operate in conjunction with the two records 42 and 43. Each sound reproducing device 46, 47 is provided with a stylus 50 connected with the diaphragm of a sound reproducing box 51 of any approved construction and attached to a horn 52 fulcrumed on a pivot 53 held in the swell box 20. A spring 54 is connected with each horn 52 to normally hold the corresponding stylus 50 out of engagement with its sound groove 44 or 45. The sound reproducing devices for the several grooves 44 and 45 of each roller 42 and 43 are preferably arranged in staggered relation one to the other so as to take up comparatively little room in the swell box 20. The sound reproducing devices 46 and 47 are controlled from the keys 12 of the keyboard 10 and for this purpose the following electromagnetic arrangement is used: On each horn 52 of the reproducing device 46 is secured an armature 60 opposite an electromagnet 61 connected by a wire 62 with a contact point 63 mounted on the back of the key frame 11 directly opposite the rear end of a corresponding key 12. Each electromagnet 61 is further connected by a wire 64 with a battery 65 or other source of electrical energy, and this wire 64 connects with a contact plate 66 mounted on the corresponding key 12 to engage the contact 63 on shifting the corresponding key 12 rearwardly in a transverse direction. Each of the horns 52 of the reproducing device 47 is provided with an armature 70 operating in conjunction with an electromagnet 71 having one wire 72 connected with the wire 64 and having its other wire 73 connected with a contact 74 arranged at the bottom of the key frame 11 to be engaged by a contact 75 on the plate 66 whenever the corresponding key 12 is swung downward by the organist. Thus when the organist imparts a sliding movement to a key then the circuit for the wires 62 and 64 is closed by the contact plate 66 and the contact 63 to cause the corresponding electromagnet 61 to attract the armature 60 of the corresponding horn 52 to impart a swinging motion to the same against the tension of the spring 54 to engage the stylus 50 with the corresponding groove 44 of the record 42. When a key 12 is pressed then the contact 75 moves into engagement with the contact 74 to close the circuit for the wires 64, 72 and 73 for the armature 71 to impart a swinging motion to the corresponding horn 52 of the reproducing device for the record 43 to engage the corresponding stylus 50 with a groove 44 of this record 43. It is understood that according to the position of a key the corresponding stylus is thrown in engagement with a corresponding sound groove 44 of the record 42 or 43 so that the corresponding tone of the human voice is reproduced. By reference to Figs. 1 and 3, it will be noticed that the contact points 63 and 74 with reference to the contact plate 66 and the contact 75 are so arranged that sundry of the keys in one position are tenor keys and in another position are bass or alto keys, and sundry of the keys in one position are soprano keys and in another position are alto keys. On sliding the tenor keys rearwardly a contact is made between the contact plate 60 and the contacts 63 so that the sound reproducing devices for the tenor grooves 44 in the record 42 are actuated to sound the corresponding single tones. In a like manner when the soprano keys are slid rearwardly a like connection is made and the sound reproducing devices for the record 42 are actuated correspondingly. When the bass keys are pressed contact is made between the contacts 74 and 75 to actuate the reproducing devices for the grooves 45 of the bass in the record 43, and when the alto keys are pressed a corresponding contact is made to actuate the reproducing devices 47 for the alto grooves 45 in the record 43.

The records 42 and 43 are driven continually in unison by the use of a suitable electric motor 80 located in the swell box 20 and controlled by a switch 81 under the control of the organist and adapted to make contact with a rheostat 82 for governing the speed of the motor 80 so that the sounding devices are harmonious in pitch with the sounding devices of the organ. The shaft 83 of the motor 80 is provided with a pulley 84 connected by an endless belt 85 with a pulley 86 secured on the shaft 41 of the record 43. On the shaft 41 is secured a pulley 87 connected by an endless belt 88 with a pulley 89 secured on the shaft 40 to rotate the records 43 and 42 in unison with each other.

The records 42 and 43 are provided with supplementary grooves 48, 49 intermediate the corresponding grooves 44, 45 and likewise representing each a single note but of different quality or timbre from the adjacent groove 44 or 45. In order to make use of the grooves 48 and 49 relative to the reproducing devices 46 and 47, it is necessary to shift the frame 30 correspondingly from the left to the right, and for this purpose the following arrangement is made: Normally the left-hand end of the frame 30 is held against a set screw 90 by the use of a spring 91, and the right-hand end of the frame 30 is provided with an armature 92 opposite an electromagnet 93 having its wires 94, 95 connected with a source of electrical energy 95 and with a switch 96 under the control of the organist. When the switch 96 is open then the electromagnet 93 is deënergized and the spring 91 holds the frame 30 in the left-hand position shown in Fig. 2. The styli 50 are now in register with the grooves 44 and 45, but when it is desired to make use of the grooves 48, 49 the organist closes the switch 96 thus energizing the electromagnet 93 whereby the armature 92 is attracted and the frame 30 is moved from the left to the right and with it the records 42 and 43 whereby the styli 50 move into register with the grooves 48 and 49. The movement of the frame 30 to the right is limited by a set screw 97 screwing in the corresponding side of the swell box 20, as plainly shown in Fig. 2.

It is understood that by the use of the switch 81 and rheostat 82 the organist is enabled to control the speed of the motor 80 and hence that of the records 42 and 43. Now, if the organ's pitch should change through conditions of temperature, the pitch of the reproducing devices can be correspondingly changed by rotating the records 42 and 43 faster for a higher pitch or slower for a lower pitch.

Although two cylindrical records are shown and described I do not limit myself to the same as all the record grooves may be made on one record, or the record grooves for each voice may be made on a single record.

In practice the vox humana range for soprano is preferably high C to B, inclusive third line of staff, alto from B to middle C of staff, bass from middle C to low C, and tenor from B third line of treble staff to C octave below middle C.

By imparting a step like movement to the frame 30 different sets of sound grooves can be moved into register with the styli ot the reproducing devices, thus enabling the organist to have the option between voices of different quality or timbre. It is evident that this feature of the invention may be increased indefinitely by providing each record with a number of sets of different sound grooves.

Having thus described my invention, I claim as new and desire to secure by Letters Patent:

1. In combination, a keyboard provided with keys each having a swinging and sliding movement, single tone phonographic records of tenor, bass, soprano and alto voices, normally inactive phonographic reproducing devices adapted to coact with the said records, and controlling means controlling the said reproducing devices and controlled by the said keys on imparting a swinging or sliding movement to the corresponding key.

2. In combination, a keyboard provided with keys each having a swinging and sliding movement, single tone phonographic records of tenor, bass, soprano and alto voices, normally inactive phonographic reproducing devices adapted to coact with the said records, and controlling devices each controlling a reproducing device singly, two of the controlling devices being controlled by one key.

3. In combination, a keyboard provided with keys each having a swinging and sliding movement, single tone phonographic records of tenor, bass, soprano and alto voices, normally inactive phonographic reproducing devices adapted to coact with the said records, and electromagnetic devices, one for each reproducing device, two of the electromagnetic devices being controlled by one key.

4. In combination a keyboard having keys encompassing the range of the human voice, each key having a swinging and a sliding movement, single tone phonographic records of tenor, bass, soprano and alto voices encompassing the tones and semitones of the chromatic scale, normally inactive phonographic reproducing devices, one for each record, and electromagnetic controlling means connecting the said reproducing devices with the said keyboard, each key controlling two of the said electromagnetic devices.

5. In combination, a keyboard having keys each mounted to swing and to slide, the keys encompassing the range of the human voice for tenor, bass, soprano and alto, sundry of the keys in one position being tenor keys and in another position being bass or alto keys, and sundry of the keys in one position being soprano keys and in another position being alto keys, single tone phonographic records of tenor, bass, soprano and alto voices and encompassing the tones and semitones of the chromatic scale, normally inactive phonographic reproducing devices, one for each record, and electromagnetic controlling means connecting the said reproducing devices with the said keyboard, each key controlling two of the said electromagnetic devices.

6. In combination, a keyboard, a distant swell box, a record-holding frame movable in the said swell box, means controlled by a player for controlling the movement of the said frame, different sets of single tone phonographic records of the human voice mounted on the said frame, normally inactive reproducing devices mounted in the swell box and adapted to coact with any one of the said sets of single tone records on shifting the frame and the records, and means controlled by the keys of the keyboard to actuate the said reproducing devices on a player actuating the corresponding keys on the said keyboard.

7. In combination, a keyboard provided with keys each having a swinging and a sliding movement, phonographic single tone records located a distance from the said keyboard, normally inactive phonographic reproducing devices adapted to coact with said records, and sets of electromagnetic means of which one set is controlled by the said keys when the latter are in one position and the other set of electromagnetic means is controlled by the said keys when the latter are in another position, the said electromagnetic means controlling the said phonographic reproducing devices to throw the latter into action on actuating the corresponding keys of the said keyboard.

8. In combination, a keyboard provided with keys each having a swinging and a sliding movement, phonographic single tone records, normally inactive phonographic reproducing devices adapted to coact with the said records, and sets of electromagnetic means of which one set is controlled by the said keys when the latter are in one position and the other set is controlled by the said keys when the latter are in another position, the said electromagnetic means controlling the said phonographic reproducing devices to throw the latter into action on actuating the corresponding keys of the said keyboard.

9. In combination, a keyboard provided with keys each having a double movement, phonographic records, normally inactive phonographic reproducing devices adapted to coact with the said records, and sets of actuating devices connected with the said phonongraphic reproducing devices, one of the said sets of actuating devices being controlled by the said keys when the latter are in one position and the other set of actuating devices being controlled by the said keys when the latter are in another position.

10. In combination, a keyboard provided with keys each mounted to swing and to slide, sound producing devices, and sets of actuating devices for actuating the said sound producing devices, one of the said sets of actuating devices being controlled by the said keys when the latter are in one position and the other set of actuating devices being controlled by the said keys when the latter are in another position.

In testimony whereof I have signed my name to this specification in the presence of two subscribing witnesses.

THOMAS ALLEN CLEAVER.

Witnesses:
  GEO. G. HOSTER,
  PHILIP D. ROLLHAUS.